United States Patent
Denny et al.

(10) Patent No.: US 7,284,500 B2
(45) Date of Patent: Oct. 23, 2007

(54) ANIMAL FEEDER

(75) Inventors: Billy L. Denny, Cedar Rapids, IA (US);
Scott A. Hodge, Marion, IA (US);
Mark S. McKinstry, Cedar Rapids, IA
(US); Joseph R. A. Robinson, Cedar
Rapids, IA (US)

(73) Assignee: Nelson Manufacturing Company,
Cedar Rapids, IA (US)

( * ) Notice: Subject to any disclaimer, the term of this patent is extended or adjusted under 35 U.S.C. 154(b) by 0 days.

(21) Appl. No.: 11/698,351

(22) Filed: Jan. 25, 2007

(65) Prior Publication Data

US 2007/0119379 A1 May 31, 2007

Related U.S. Application Data

(62) Division of application No. 10/963,055, filed on Oct. 12, 2004.

(51) Int. Cl.
*A01K 5/00* (2006.01)
(52) U.S. Cl. .................................. 119/61.57
(58) Field of Classification Search ............ 119/61.57,
119/60, 61.1, 61.3, 61.5, 72, 51.01, 52.1;
248/311.2, 310, 309.1, 314, 221.11, 220.21;
220/23.87, 23.89; D30/121, 129, 130, 131,
D30/133
See application file for complete search history.

(56) References Cited

U.S. PATENT DOCUMENTS

| 1,055,950 | A | * | 3/1913 | Steel | 215/12.1 |
| 1,180,987 | A | * | 4/1916 | Doty | 119/61.3 |
| 1,599,352 | A | * | 9/1926 | Ahlman | 119/61.57 |
| 2,710,491 | A | * | 6/1955 | Carlson | 47/41.1 |
| 3,670,916 | A | * | 6/1972 | Alpert | 220/23.87 |
| 3,749,063 | A | * | 7/1973 | Buffum | 119/61.56 |
| 3,810,446 | A | * | 5/1974 | Kightlinger et al. | 119/61.55 |
| 4,587,930 | A |   | 5/1986 | Trego | |
| 5,144,912 | A | * | 9/1992 | Hammett et al. | 119/61.57 |
| 5,209,184 | A |   | 5/1993 | Sharkan et al. | |
| 5,709,168 | A | * | 1/1998 | Walker | 119/61.5 |
| 6,427,626 | B1 | * | 8/2002 | Quinlan et al. | 119/51.01 |

OTHER PUBLICATIONS

Printout from Website Farnam Equipment.
Catalog Page—pp. 193 and 194.
Prior Art Brochure showing automatic horse waterers.

* cited by examiner

*Primary Examiner*—T. Nguyen
(74) *Attorney, Agent, or Firm*—Schiff Hardin LLP

(57) ABSTRACT

An animal feeder and assembly method is provided wherein a removable top cover has a feeder bowl opening. A feeder bowl is aligned with the opening in the top cover and is pressed against the top cover by a suspension system. A sidewall is provided to which the removable top cover is secured at a top of the sidewall. A bottom cover is secured at a bottom of the sidewall.

4 Claims, 7 Drawing Sheets

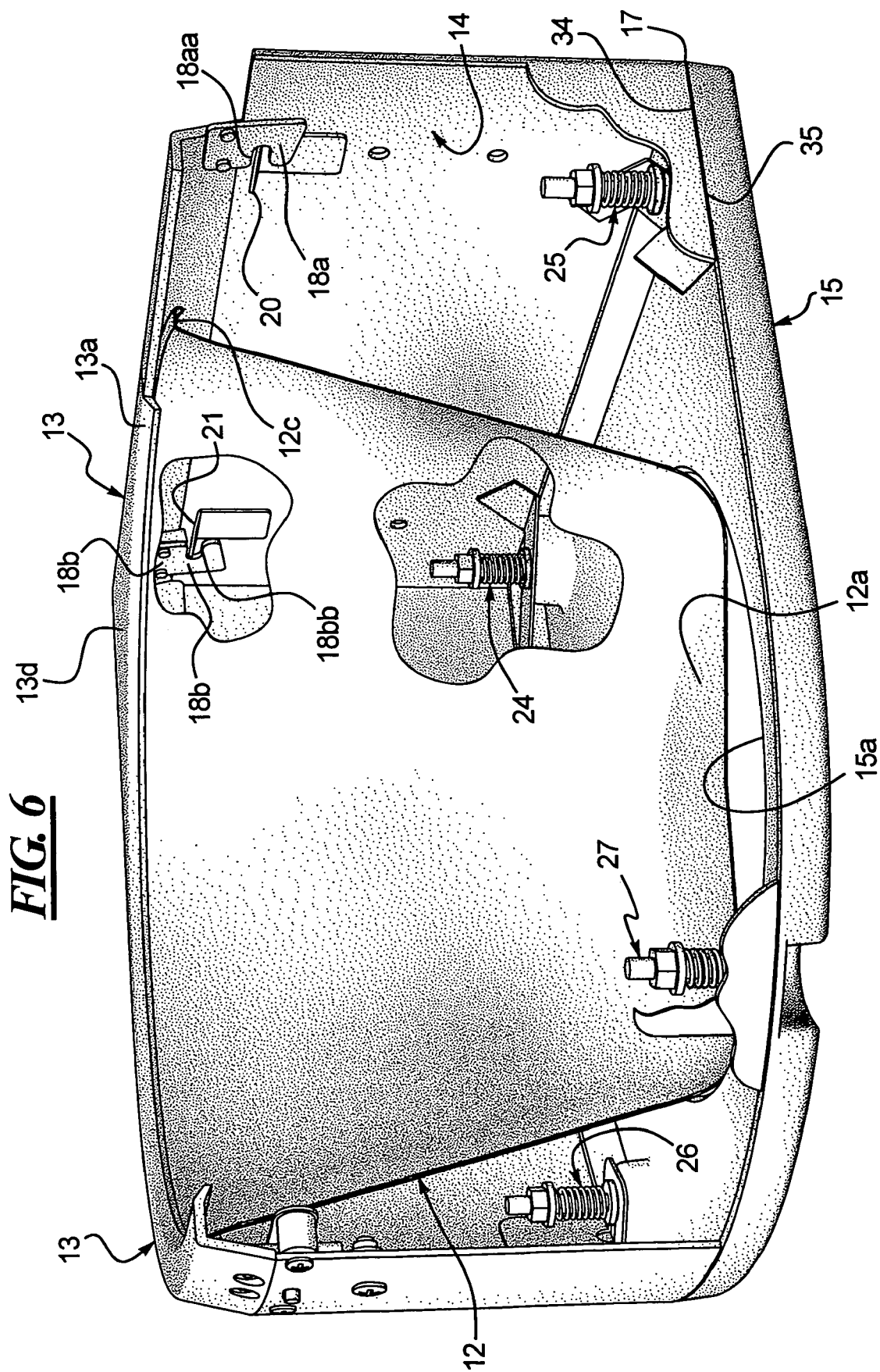

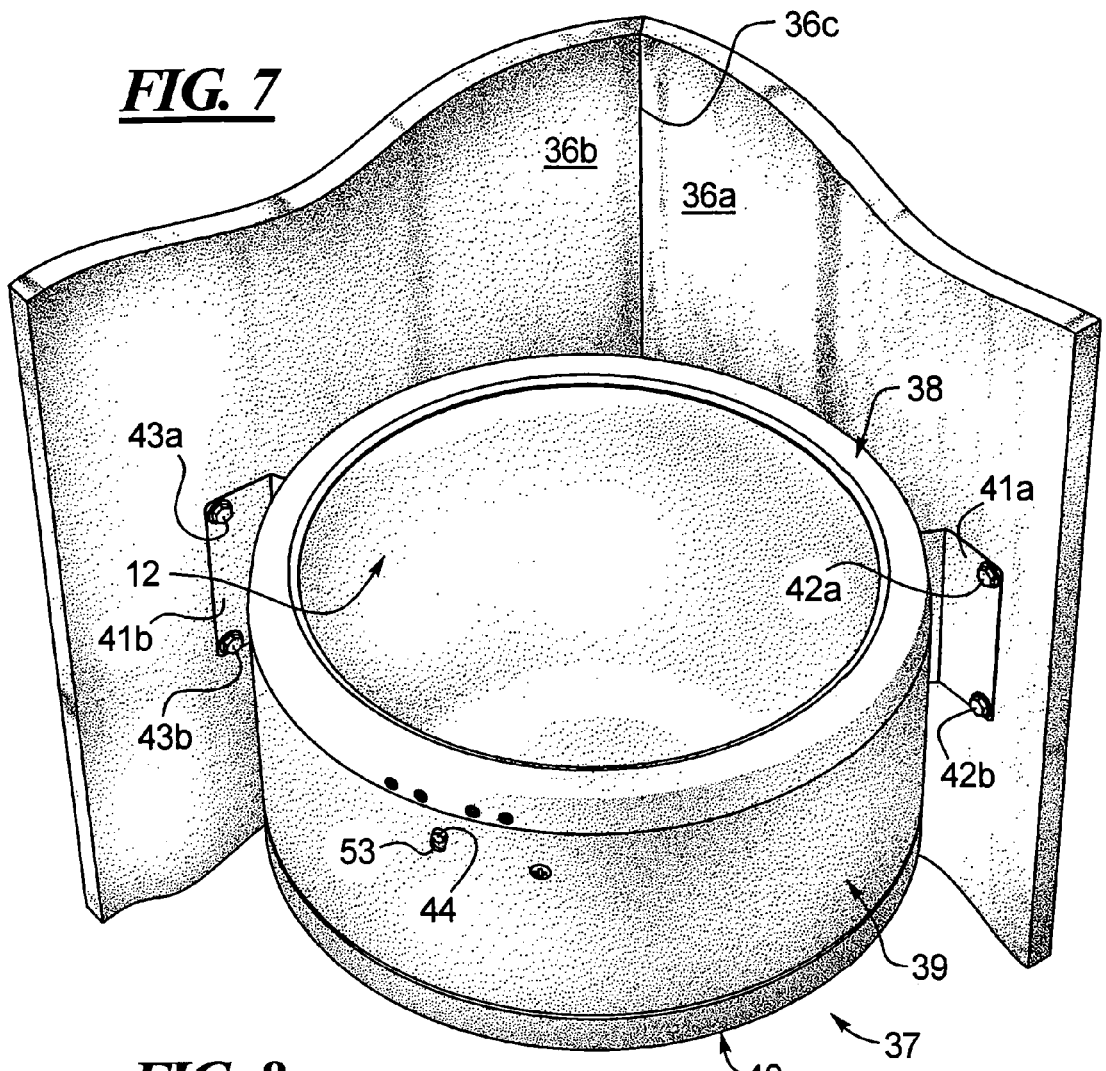
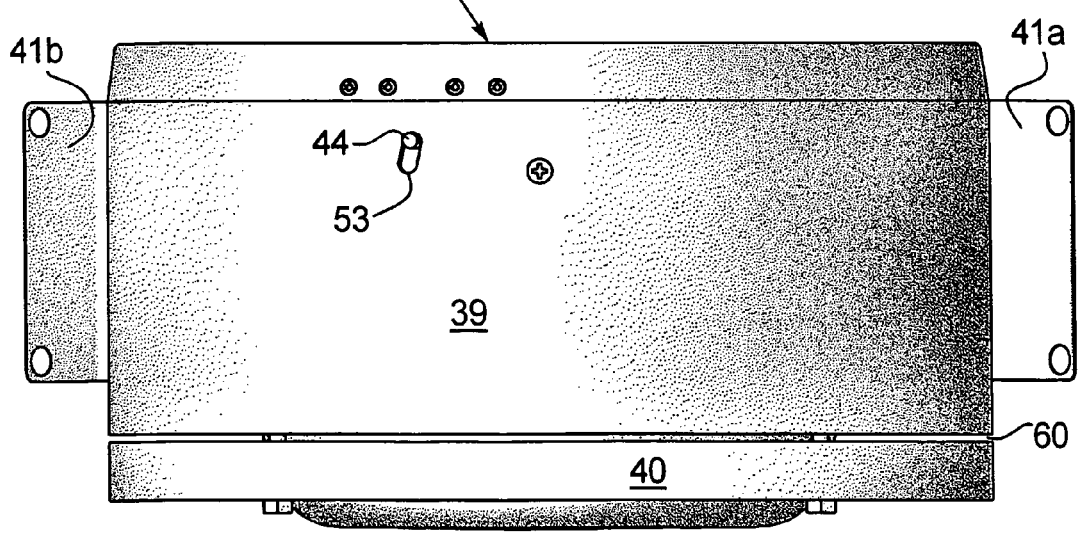

ANIMAL FEEDER

RELATED APPLICATION

This is a divisional application of Ser. No. 10/963,055 filed Oct. 2, 2004 of the same inventors filed Oct. 12, 2004 entitled "ANIMAL FEEDER"

BACKGROUND

It is known in the prior art to provide various types of equipment for feeding livestock animals in a farm environment, or feeding animals in a zoo environment. It was previously known to provide different kinds of baskets for holding hay such as for horses, or to provide containers for feed grains. More particularly, it was known to provide a cast aluminum corner feeder having two surfaces for corner mounting and a rounded peripheral surface. Such bowls were made of cast aluminum and/or plastic, steel, or other materials.

With such prior art devices, such as containers holding feed grain, they are not easily cleaned, and are also subject to damage by the animal being fed, such as in a horse stall environment for example, where the horse might kick or bump the feeder container.

SUMMARY

It is an object to provide an improved animal feeder which is protected from damage, but which can be easily cleaned.

An animal feeder and assembly method is provided wherein a removable top cover has a feeder bowl opening. A feeder bowl is aligned with the opening in the top cover and is pressed against the top cover by a suspension system. A sidewall is provided to which the removable top cover is secured at a top of the sidewall. A bottom cover is secured at a bottom of the sidewall. A latch mechanism removably retains the top cover to a top of the sidewall.

BRIEF DESCRIPTION OF THE DRAWINGS

FIG. 6 is a perspective cut-away view of an animal feeder of FIG. 1;

FIG. 7 is a perspective view of a second embodiment of the animal feeder;

FIG. 8 is a front view of the animal feeder of FIG. 7;

DESCRIPTION OF THE PREFERRED EMBODIMENTS

Figure 1:
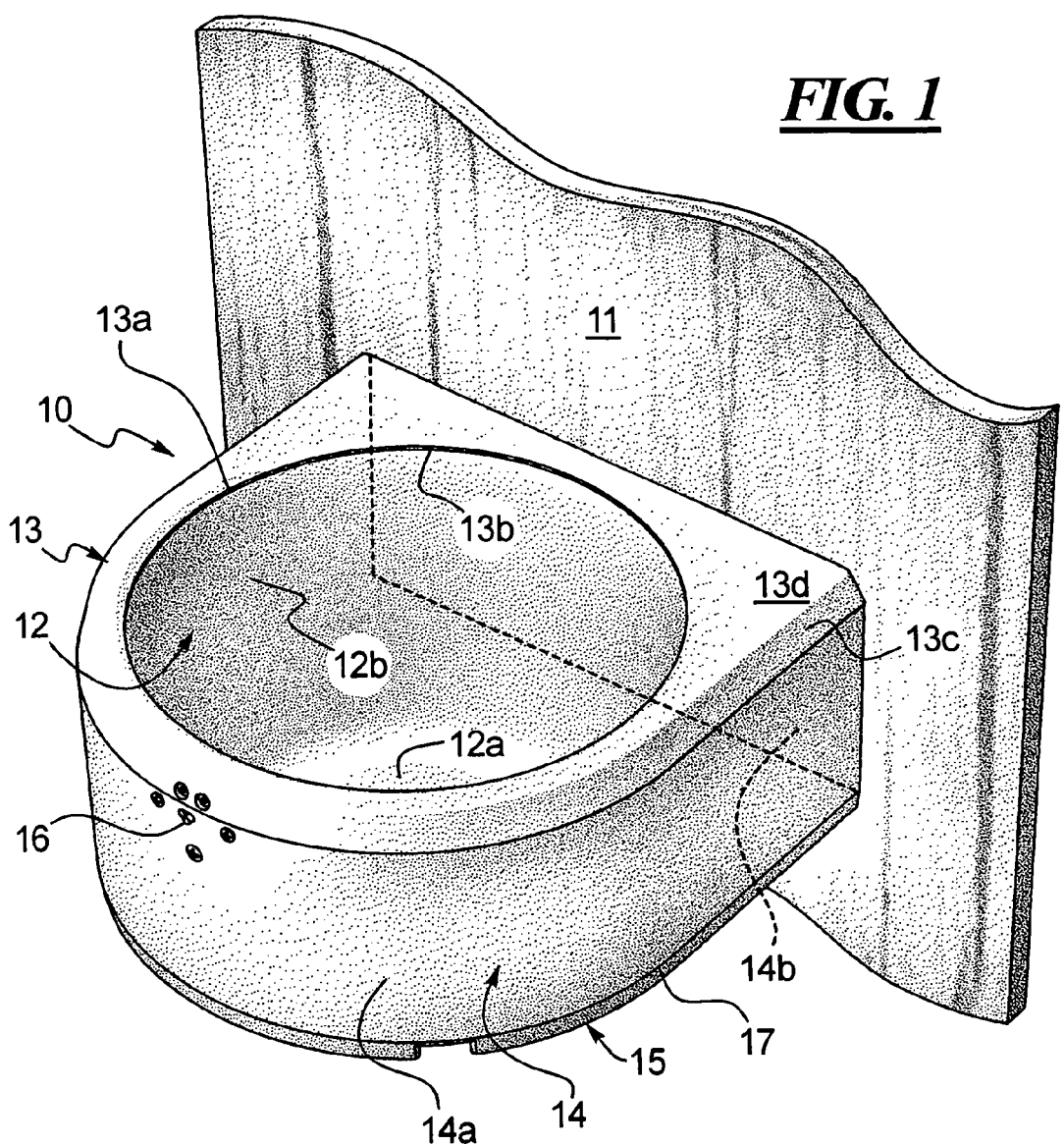
FIG. 1 is a perspective view of a first embodiment of an animal feeder.
Figure 2:
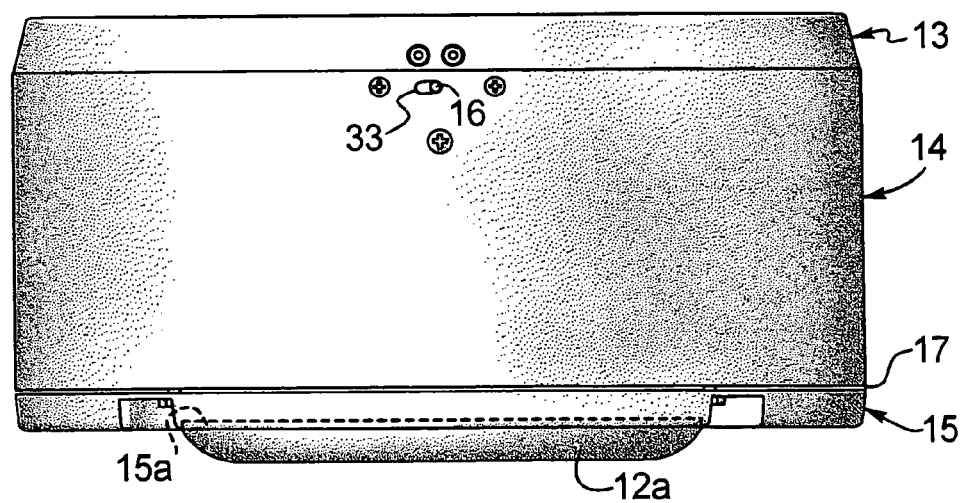
FIG. 2 is a front view of the animal feeder of FIG. 1.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated devices, and/or methods, and such further applications of the principles of the invention as illustrated therein being contemplated as would normally occur now or in the future to one skilled in the art to which the invention relates.

Figure 3:
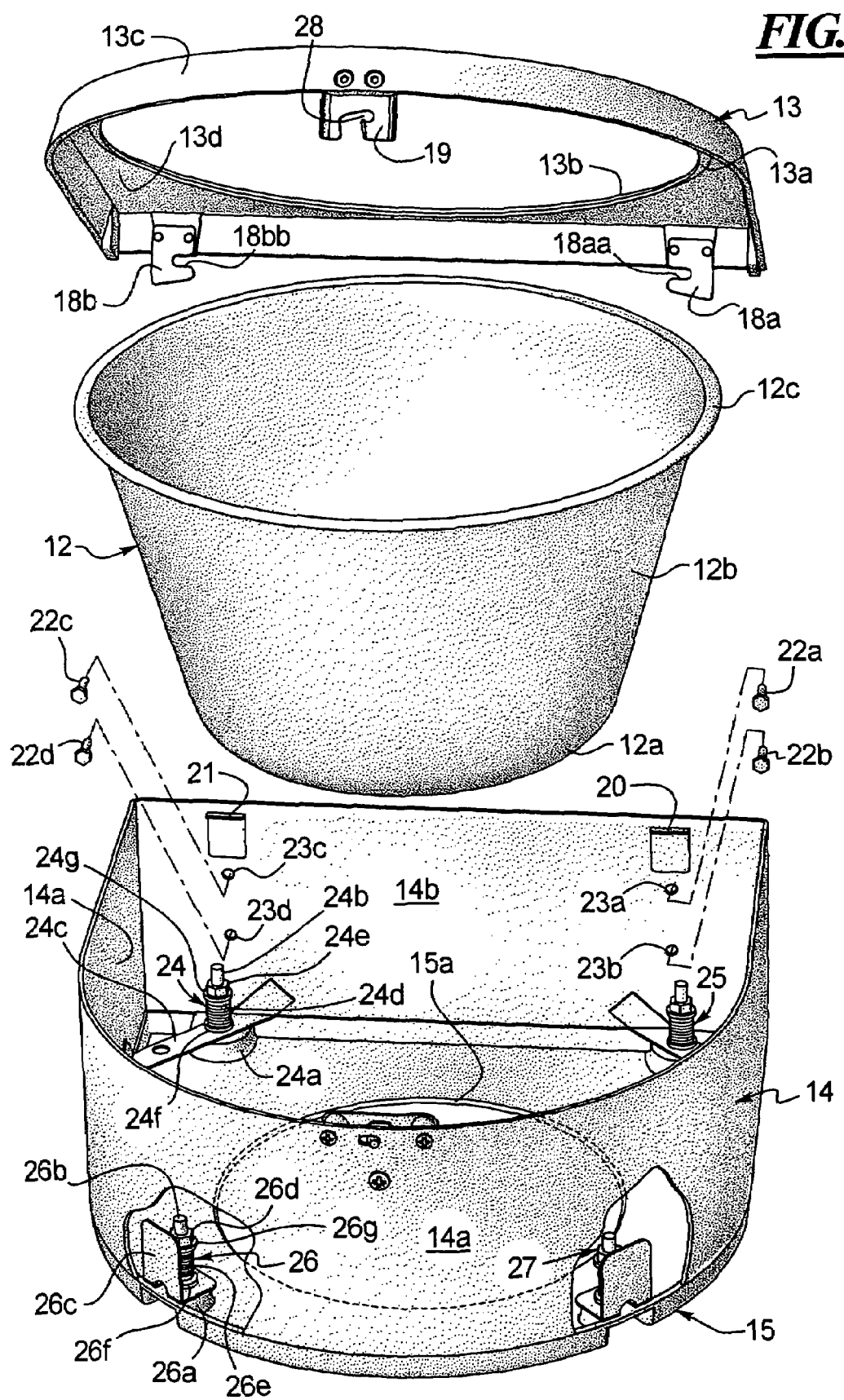
FIG. 3 is an exploded perspective view of the animal feeder of FIG. 1.

A first embodiment of the horse feeder is generally shown at 10 in FIG. 1. The horse feeder 10 is mounted at its straight back portion 14b to a wall 11 such in a stable. A wall or any other location including a post, pole or other appropriate location may also be used as a mounting location. As shown in FIG. 3, bolts 22a-22d passing through apertures 23a-23d secure the horse feeder 10 to the wall 11.

As shown in the exploded view of FIG. 3, the horse feeder 10 comprises a top cover 13 which may be an aluminum casting or stainless steel, a feeder bowl 12 which may be stainless steel or aluminum, sidewall 14 formed of U-shaped portion 14a and a straight back portion 14b, and a bottom cover 15 which may be cast aluminum or stainless steel.

The cover 13 has a downwardly inclined cover lip 13a defining an opening 13b for access to the feeder bowl. Since the cover lip 13a overlaps the lip 12c of the bowl 12, feed in the bowl 12 is prevented from spilling out over the top.

The cover 13 also has a top surface 13d and a downwardly extending rim 13c.

The feeder bowl 12 has a tapering round sidewall 12b with the lip 12c at the top, and a concave base 12a at the bottom.

The bottom cover 15 is separated from a bottom of a sidewall 14 by a gap 17 resulting from the base 12a of the feeder bowl pushing down on the bottom cover 15 attached by four suspension mechanisms 24, 25, 26 and 27 to the sidewall 14, as explained in greater detail hereafter.

An edge may be provided to a top edge of bottom cover 15 which angles inward to block light, making it look as if there is no gap.

A latch pin 16 protrudes through a latch pin guide slot 33 from the U-shaped portion 14a of the sidewall 14.

The base 12a of the feeder bowl extends down through a centering aperture 15a of the bottom cover 15. This aperture centers the bowl and also supports the bowl as the bowl pushes down on the bottom cover 15 when the bowl is installed. As the bowl pushes down the bottom cover 15, respective springs for the four suspension mechanisms 24, 25, 26, and 27 are compressed.

The back suspension mechanisms 24 and 25 have the same construction. Back suspension mechanism 24 comprises a bolt 24b, a head of which is received in an indent 24a in the bottom cover 15, a nut 24e, a spring 24d, and a mounting strip 24c. Washers 24f and 24g are provided at opposite ends of the spring. One end of the mounting strip is attached to the flat back straight sidewall portion 14b and the other end is attached to the U-shaped portion 14a of the sidewall 14.

The front suspension mechanisms 26 and 27 have the same construction. A head of a bolt 26b is received in a corresponding indent or recess 26a in the bottom cover 15, a nut 26d retains a spring 26e, and a mounting strip 26c attaches the suspension mechanism to the U-shaped sidewall 14a. Washers 26f and 26g are provided at opposite ends of the spring.

Figure 4:
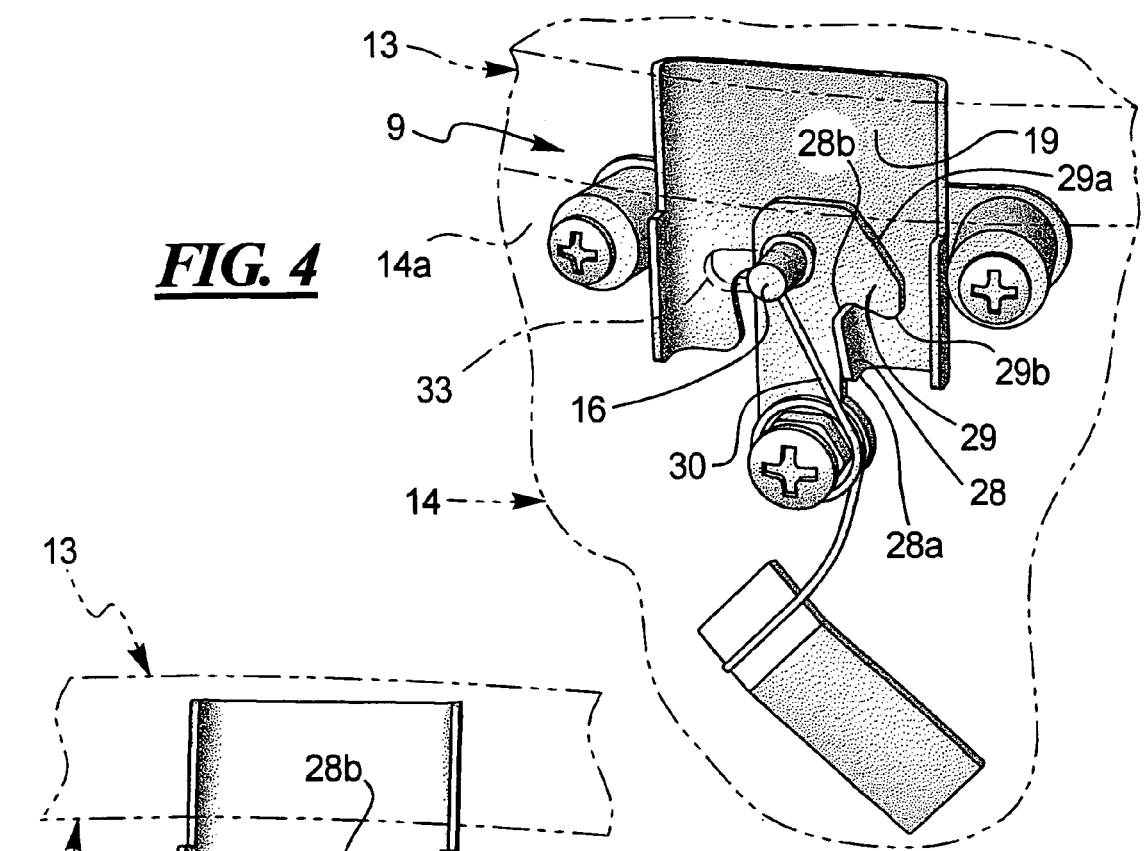
FIG. 4 is a fragmentary enlarged view in perspective of a latch mechanism of the animal feeder of FIG. 1.
Figure 5:
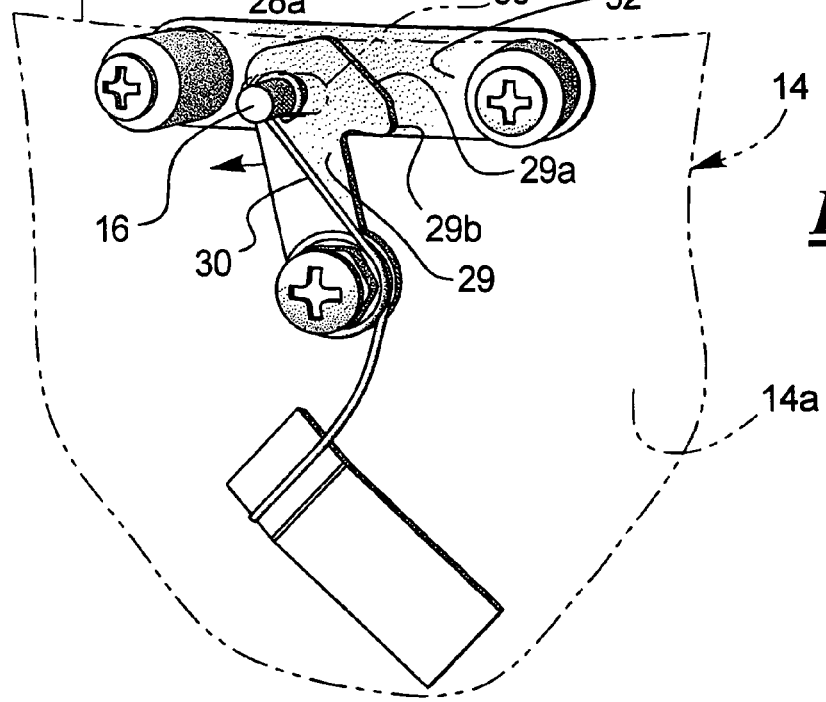
FIG. 5 is an exploded view of the latch mechanism of FIG. 4.

As shown in FIG. 3 and FIG. 6, to assemble the feeder bowl inside the housing formed of the cover 13, sidewall 14, and bottom cover 15, first the feeder bowl 12 is placed with the base 12a extending through the bottom hole 15a of the cover 15. This bottom hole aligns the feeder bowl and secures the feeder bowl when the top cover is engaged and with the bowl being pushed against the hole 15a by the effect of the suspension system. Then the slots 18aa and 18bb of respective locking plates 18a and 18b are slid over the corresponding projection portions of respective locking tabs 20 and 21. Then the front of the top cover 13 is pressed down so that, as illustrated in FIGS. 4 and 5, a spring loaded latch arm 29, with latch pin 16 movable in latch pin guide slot 33, is cammed by its cam surface 29a along a bottom edge 28a of projecting surface 28 of latch plate 19 until a nose 29b latches over a top edge 28b of projecting surface 28. The spring loaded latch arm 29 has associated spring 30. A protector plate 32 is also provided in an inward direction from the latch mechanism at the inside top of the U-shaped sidewall 14a.

In a second embodiment, a round horse feeder 37 is illustrated in FIG. 7 which attaches preferably at a corner 36c formed by perpendicular walls 36a and 36b. Respective mounting brackets 41a and 41b with respective mounting screws or bolts 42a, 42b and 43a, 43b are attached to the respective vertical sidewalls 36a and 36b defining the corner 36c.

The round horse feeder 37 has a round top cover 38, a round sidewall 39, and a round bottom cover 40. A latch pin 44 is provided in guide slot 53 at the front.

Figure 9:
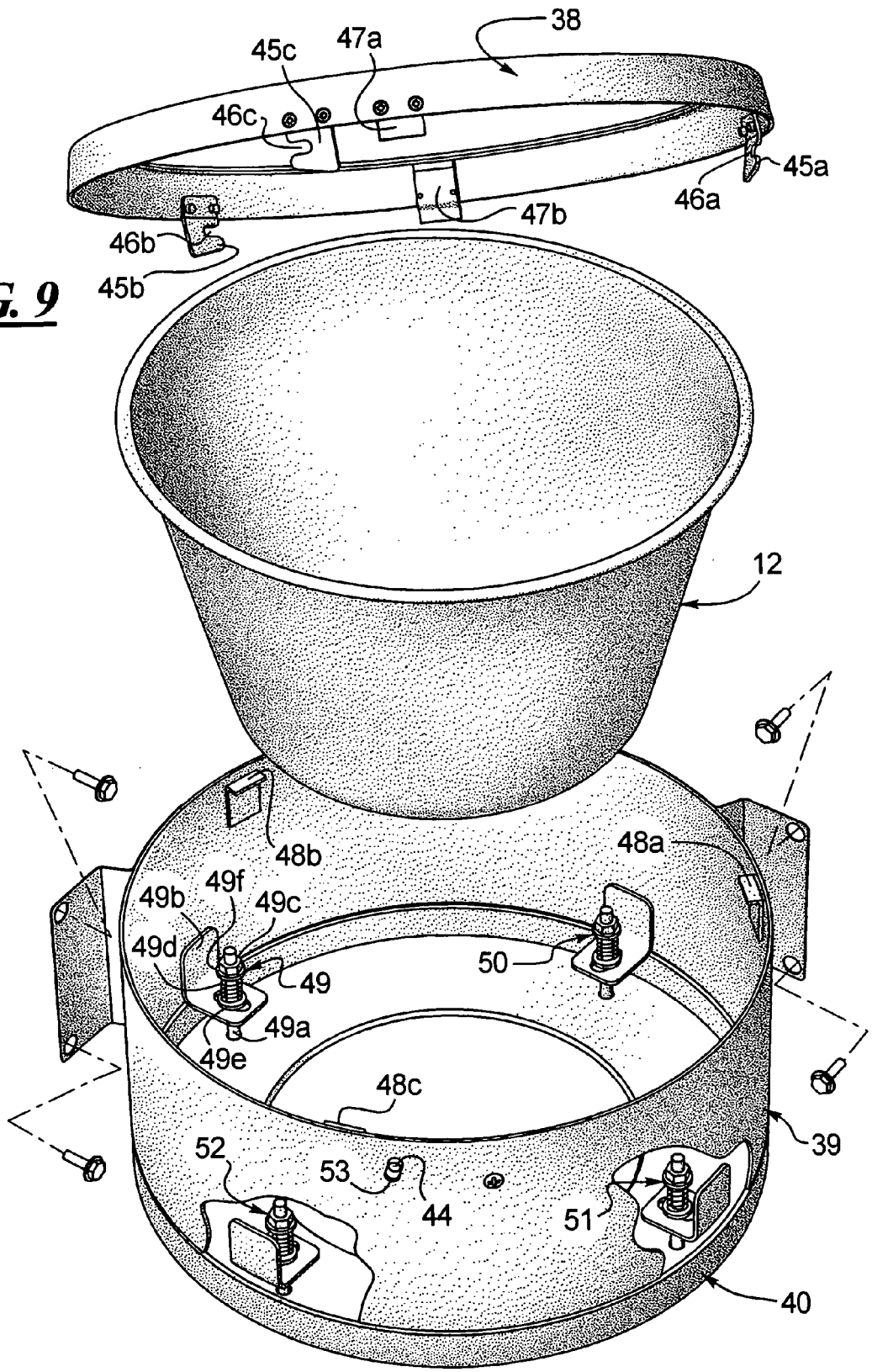
FIG. 9 is a perspective view of the animal feeder of FIG. 7.
Figure 10:
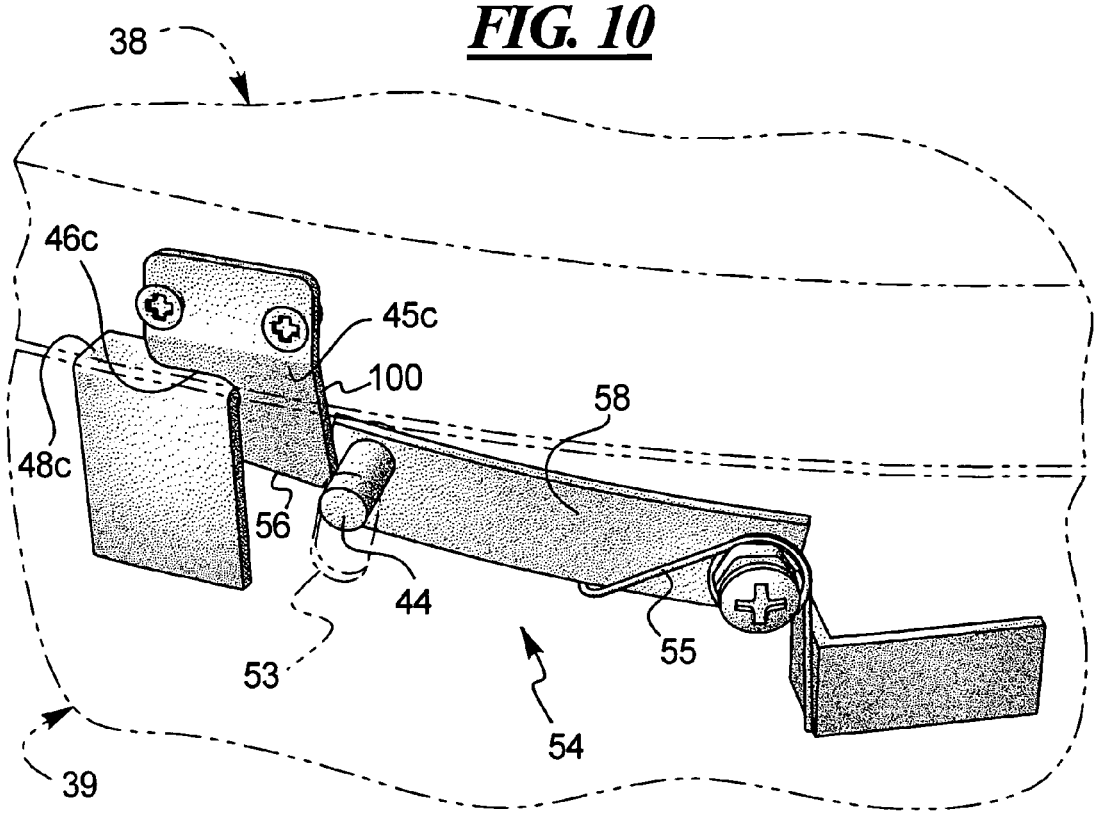
FIG. 10 is an enlarged fragmentary perspective view of the latch mechanism of the animal feeder of FIG. 7 in the latched or locked position.
Figure 11:
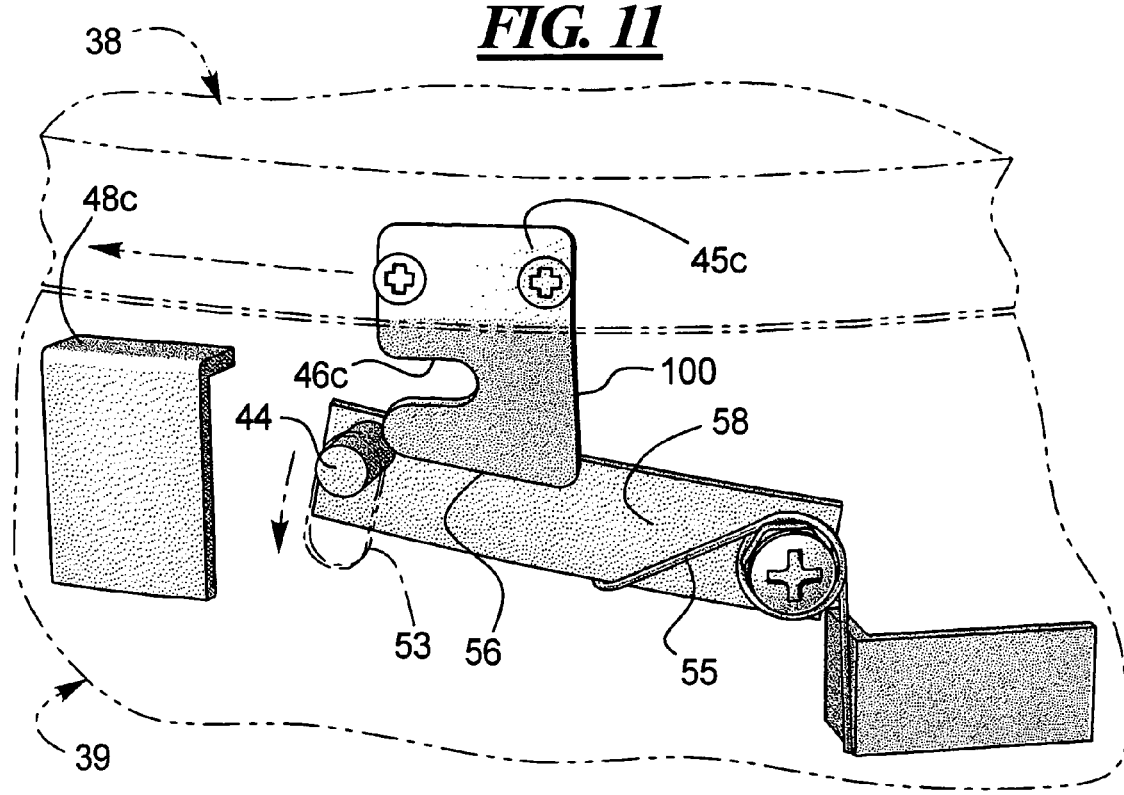
FIG. 11 is an enlarged perspective view of the latch mechanism of FIG. 10 in the unlocked position.

The suspension concept of the second embodiment is similar to the first embodiment but the method of assembly has some differences, as illustrated in FIGS. 9-11.

The top cover 38 has downwardly extending locking plates 45a, 45b, 45c and also downwardly extending guide tabs 47a, 47b. Slots 46a, 46b, and 46c of the locking plates interact with locking tabs 48a, 48b, and 48c as the top cover 38 is rotated so that the locking tabs engage in the locking plate slots.

In lieu of guide tabs 47a, 47b, a circular air seal may be provided by providing at a bottom of the downwardly extending rim of top cover 38 an inwardly extending portion (such as about ⅛") followed by a short portion breaking vertically down.

As was the case with the first embodiment, when assembled the bowl presses down on the bottom cover 40 to create a gap 60 shown in FIG. 8 between the bottom cover 40 and sidewall 39. As shown in FIG. 9, suspension mechanisms 49, 50, 51 and 52 are provided. Each of the suspension mechanisms is the same. As shown for suspension mechanism 49, a bolt 49a has a head beneath cover 40 and which protrudes up through an aperture in the cover through an L-shaped mounting strip 49b, and then through a spring 49d having an associated nut 49c compressing the spring. Washers 49e and 49f are provided at opposite ends of the spring.

The latching mechanism is shown in FIG. 10 in the latched position and also in FIG. 11 in the unlatched position where the top cover is rotated clockwise when viewed from the top. As shown in FIG. 10, the latch pin 44 is attached to a spring loaded latch arm 58 with associated spring 55. The latch mechanism 54 also has a guide slot 53 for the latch pin 44. A cam surface 56 at a bottom of locking plate 45c abuts against pin 44 as shown in FIG. 11 when the arm is in the upward position as the camming action is about to begin. As shown in FIG. 11, with the latch pin 44 in the upward position, the top cover is rotated clockwise when viewed from the top in order to begin the latching process. FIG. 10 shows the latched position where the locking tab 48c is received in the slot 46c of locking plate 45c and arm 58 is in the upper position where pin 44 hits side locking edge 100 of locking plate 45c.

Instead of the bolt and nut suspension system described, other variations are within the scope of this disclosure. For example, instead of the bolt and nut, a clevis pin with a hairpin cotter may be employed with the head of the clevis pin under the bottom cover.

With the two embodiments of the animal feeder illustrated and disclosed, the stainless steel construction has a pleasant appearance and holds up for many years. The heavy-duty stainless steel housing protects the bowl from kicks, knocks, and other abuse by the animal during feeding. The rugged top and bottom aluminum castings also protect the feeding bowl from cribbing, kicking and other abuse.

The stainless steel construction of the feeder bowls and the sidewalls has a pleasant appearance and holds up for many years. Also, the stainless steel feeding bowl is easily removable and allows one to empty, clean, and sterilize the bowl away from the feeder housing and the animal stall.

The feeder design minimizes the feed waste for the following reasons. The deep bowl discourages an animal such as a horse from sweeping feed out. The lip on the top casting which overlaps the feeder bowl lip helps retain the feed. The spring suspension which keeps the bowl tight against the bottom surface of the top casting prevents feed from spilling out over the top of the bowl and down into the housing.

The hole in the bottom casting with the feeder bowl removed provides an exit for material to clean away and thus assists when cleaning. It also locates the bowl in the housing and keeps the bowl in a fixed position.

The feeder bowl is easy to install with four mounting bowl holes being provided in each embodiment to bolt to a wall or other surface in a very short time.

While preferred embodiments have been illustrated and described in detail in the drawings and foregoing description, the same is to be considered as illustrative and not restrictive in character, it being understood that only the preferred embodiments have been shown and described and that all changes and modifications that come within the spirit of the invention both now or in the future are desired to be protected.

We claim:

1. A method for assembling an animal feeder, comprising the steps of:
   providing a sidewall having a bottom and a top, providing a bottom cover having an aperture wherein the bottom cover is attached at the bottom of the sidewall by a suspension system, providing a feeder bowl having a top surface, and providing a top cover having a bottom surface;
   placing the feeder bowl inside the sidewall and through the aperture in the bottom cover; and
   placing the top cover onto the top of the sidewall and latching it in place, the suspension system allowing a gap to form between the bottom of the sidewall and the bottom cover and causing the top surface of the feeder bowl to press against the bottom surface of the top cover.

2. A method of claim 1 including the step of attaching the top cover by engaging a back of the top cover with at least one locking tab, swinging the top cover down, and engaging the latch mechanism.

3. A method of claim 1 including the step of attaching the top cover by rotating the top cover to engage locking tabs and by activating a latch mechanism.

4. A method for assembling an animal feeder, comprising the steps of:
- providing a sidewall having a bottom and a top, a bottom cover, an animal feeder bowl having a top surface, a top cover having a bottom surface, and a spring-loaded system;
- placing the feeder bowl inside the sidewall; and
- placing the top cover onto the top of the sidewall, pushing down on the top cover to vertically move the feeder bowl down a vertical distance against a resilient spring force of the spring-loaded system to cause at least one spring of the spring-loaded system to compress by said vertical distance and thus permit said vertical movement, and then locking the top cover in place, the spring-loaded system causing a top of the feeder bowl to press against the bottom surface of the top cover.

* * * * *